July 10, 1934.  P. E. HOLT  1,965,839
AUXILIARY GLARE SHIELD FOR MOTOR VEHICLES
Filed Feb. 12, 1932
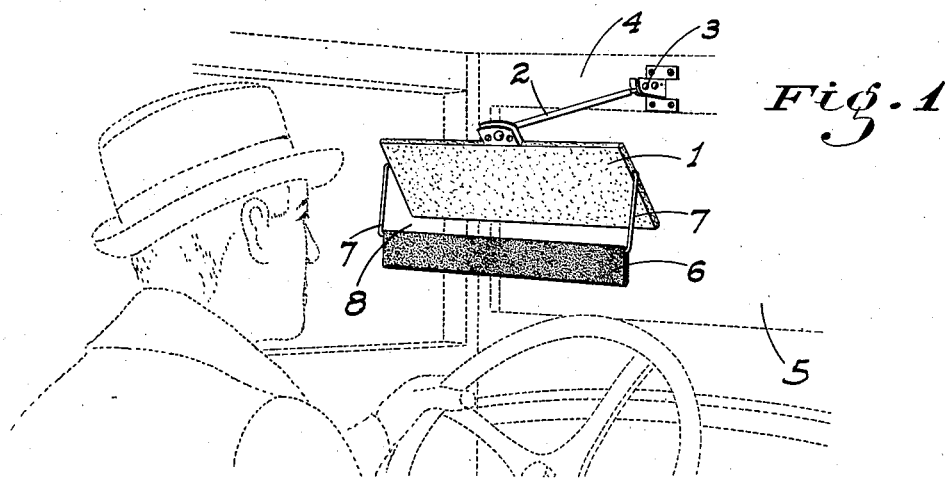
*Fig. 1*
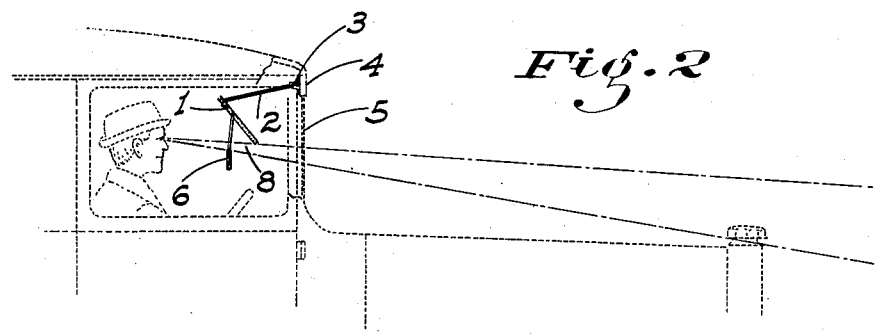
*Fig. 2*
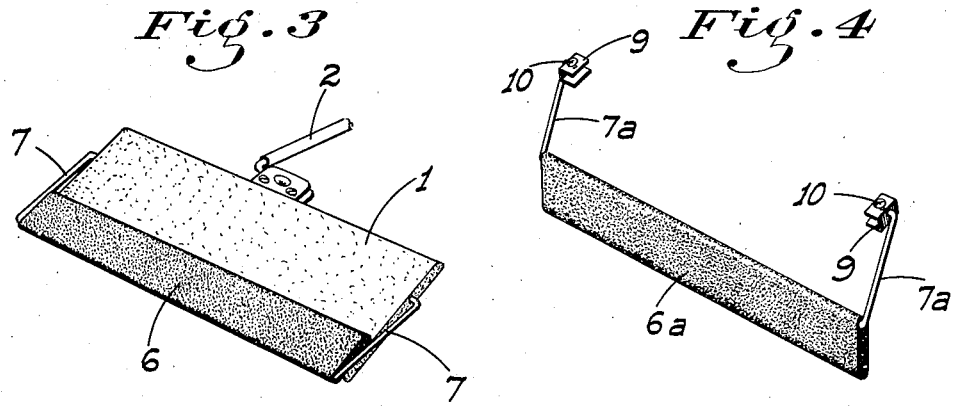
*Fig. 3*  *Fig. 4*
INVENTOR
P. E. Holt
BY
ATTORNEY Patented July 10, 1934

1,965,839

UNITED STATES PATENT OFFICE 1,965,839

AUXILIARY GLARE SHIELD FOR MOTOR VEHICLES

Pliny E. Holt, Stockton, Calif.

Application February 12, 1932, Serial No. 592,467

8 Claims. (Cl. 296—97)

This invention relates to glare shield attachments for motor vehicles, and particularly to an auxiliary shield adapted to be used in connection with the interior shields with which cars are now being equipped and which supplement or take the place of the exterior visors across the top of the windshield.

Shields of this type, as they are now made, can be adjusted to adequately protect the eyes of the driver from the glare of the sun or oncoming lights some distance ahead; but no provision has been made to protect the eyes from the glare thrown from the hood of the car from the polished backs of the headlights or from the road close to the car, and such glare is very tiring to the eys, as is well known. The shields as ordinarily constructed cannot be used, no matter how adjusted, to both cut off the glare from the roadway ahead and that from the hood and other close parts as well, since if adjusted in position to cut the latter glare it will shut off the necessary driving vision of the operator.

The principal object of my invention therefore is to supplement the action of the main shield by the provision of an auxiliary shield so associated with said main shield as to fully protect the eyes of the driver from hood and similar glares without interfering with the position of the main shield to serve its particular purpose, and without obstructing or in any way interfering with the road vision of the driver.

The auxiliary shield is also mounted in connection with the main shield so that it may be folded onto the same when not in use, so that the shield unit as a whole will occupy but little more space in a folded position than when the auxiliary shield is provided.

A further object is to arrange the auxiliary shield so that the main and auxiliary shields may be manufactured as a complete unit; or the auxiliary shield may be arranged as an attachment to be detachably applied to the main shield. The device is therefore of value either in new construction or in connection with a shield already on the market or installed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Fig. 1 is a fragmentary perspective outline of the interior of the driver's compartment of an automobile showing my auxiliary shield as mounted in unitary connection with the main shield and in operation.

Fig. 2 is a fragmentary side outline of an automobile showing the auxiliary shield installed and in use.

Fig. 3 is a perspective view of the main and auxiliary glareshield unit arranged in folded relation.

Fig. 4 is a perspective view of the auxiliary shield in the form in which it would be manufactured as an attachment separate from the main shield and adapted for detachable connection therewith.

Referring now more particularly to the characters of reference on the drawing, and particularly at present to Figs. 1 to 3 the main glare shield comprises a rectangular panel 1 of suitable material swively supported from an arm 2 which in turn is swivelly supported from a bracket 3 attached to the transverse sill 4 of the car body above the windshield 5. When in use the shield is disposed a short distance back of the windshield and is set with a downward slant toward the front as shown.

The auxiliary shield comprises a rectangular panel 6 preferably of the same material as that of the panel 1 and relatively narrow as to height, but the same length transversely of the car as the main shield 1. The panel 6 is hung from arms 7 pivotally connected to the ends of the same at the top, and extending thence to similar connections with the ends of the shield 1 intermediate the top and bottom edges of the same. The arms are preferably in the form of rods, bent at their ends toward the shields to form the necessary pivotal connections therewith.

The points of connection of the arms 7 with the main shield is such that when said arms lie parallel to the shield the top edge of the auxiliary shield just clears the bottom edge of the main shield. This allows the auxiliary shield to be folded up and forwardly so as to lie in close superimposed relation on the main shield, as shown in Fig. 3—a position occupied by said auxiliary shield when the structure is not in use.

The length of the arms between their points of pivotal connection is also such that when the main shield is disposed at an operating angle and the arms are hanging straight down, a gap 8 in a vertical plane is then formed between the adjacent edges of the shields, as plainly shown in Fig. 2. When the main shield is properly adjusted to position this gap will be in the direct line of driving vision of the operator, while the main shield cuts off the relatively long distance glare above such line of vision, and the auxiliary shield cuts off glare below the line of vision, or that which would otherwise be reflected into the eyes from the hood and adjacent parts.

The arrangement of the shields as above described is that described when they are manufactured as a unit. The auxiliary shield may however be put out as an attachment applicable to a main shield already made. Such an arrangement is shown in Fig. 4, in which case the supporting arms 7a of the auxiliary shield panel 6a are pivoted to channel shaped clips 9. These are disposed in facing relation to each other and adapted to straddle and closely engage the main shield along its side or end edges. These clips may be of a self-gripping nature so as to hold of themselves on the main shield, or they may be provided with clamping screws 10 for holding engagement with the main shield.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A glare shield unit for motor vehicles comprising separate upper and lower shield elements, means supporting the upper element from its upper edge in the vehicle for swinging movement in a vertical plane, and arms at the side edges of and pivotally connected to the lower element adjacent one horizontal edge and to the sides of the upper element intermediate its horizontal edges; the arms being free to swing about the upper element and the lower element being free to swing in either direction relative to a perpendicular position of the arms.

2. A glare shield comprising a pair of panels, one adapted to be adjustably mounted adjacent the driver's seat of a motor vehicle, means pivotally suspending the other on and freely hanging below the first panel whereby with the angular adjustment of the first panel a vision slot of variable width may be provided between the two.

3. A glare shield unit comprising a hanger bracket, a pair of panels, one panel adjustably mounted on the bracket, means suspending the other panel on the first panel to hang in the same vertical plane as the first panel when the same is adjusted to hang vertically, whereby the angular adjustment of the first panel relative to its vertical plane will provide a vision slot between the two.

4. A glare shield unit comprising a pair of panels arranged to normally extend one below the other in edge to edge contact when the unit is suspended in a vertical plane, means pivotally suspending the lower panel on the other panel whereby upon adjustment of the upper panel at an angle to such vertical plane a vision slot of desired width and at a desired height may be provided between the two.

5. A glare shield comprising a main panel adapted to be adjustably positioned in front of the driver's seat in a motor vehicle, an auxiliary panel means suspending the auxiliary panel on the main panel in parallel alinement therewith, and means to adjust the main panel shield to vary the open space between it and the auxiliary shield.

6. A glare shield comprising a main panel adapted to be adjustably positioned in front of the driver's seat in a motor vehicle, an auxiliary panel means normally suspending the auxiliary panel on the main panel and in parallelism therewith, said means arranged to enable the two panels to be adjusted angularly of each other whereby to provide an open vision slot between the two.

7. A glare shield unit comprising an adjustable bracket, a pair of panels, one panel being adjustably mounted on the bracket, a pair of arms loosely pivoted at the ends of the first panel to normally hang freely along such ends when such panel is set in a vertical plane, and a second panel suspended in the outer ends of the arms to normally lie in substantially edge to edge relation to the first panel when the latter is suspended in a vertical plane.

8. A glare shield unit comprising a main panel adapted to be adjustably positioned adjacent the driver's seat of a motor vehicle, a second panel, arms pivotally mounted on the ends of the second panel adjacent one edge thereof, clips pivotally mounted on the free ends of the arms and in facing relation to each other, such clips being adapted to attach to the ends of the main panel to pivotally suspend the second panel below the same.

PLINY E. HOLT.